(12) United States Patent
Beemster et al.

(10) Patent No.: US 9,325,965 B2
(45) Date of Patent: Apr. 26, 2016

(54) SEPARATE DISPLAY SURFACES FOR EPG AND PROGRAM CONTENT

(75) Inventors: Michiel Beemster, Almemo (NL);
David Bonfrer, Almelo (NL); Marcel Westenbroek, Almelo (NL)

(73) Assignee: EchoStar Technologies L.L.C., Englewood, CO (US)

( * ) Notice: Subject to any disclaimer, the term of this patent is extended or adjusted under 35 U.S.C. 154(b) by 327 days.

(21) Appl. No.: 13/237,772

(22) Filed: Sep. 20, 2011

(65) Prior Publication Data

US 2012/0069243 A1    Mar. 22, 2012

(30) Foreign Application Priority Data

Sep. 20, 2010   (EP) ..................................... 10177592

(51) Int. Cl.
| | | |
|---|---|---|
| H04N 13/00 | (2006.01) | |
| H04N 9/31 | (2006.01) | |
| H04N 13/04 | (2006.01) | |
| H04N 21/41 | (2011.01) | |

(52) U.S. Cl.
CPC ........... *H04N 13/007* (2013.01); *H04N 9/3141* (2013.01); *H04N 13/0438* (2013.01); *H04N 21/4122* (2013.01); *H04N 2013/0463* (2013.01); *H04N 2013/0465* (2013.01)

(58) Field of Classification Search
CPC ............ H04N 13/004; H04N 13/0029; H04N 13/0059
USPC .............. 725/37–61; 715/850; 348/41, 51–53
See application file for complete search history.

(56) References Cited

U.S. PATENT DOCUMENTS

| | | | |
|---|---|---|---|
| 6,188,442 B1 | 2/2001 | Narayanaswami | |
| 2002/0085023 A1 | 7/2002 | Zustak et al. | |
| 2009/0262127 A1 | 10/2009 | Miyasaka et al. | |
| 2010/0007582 A1* | 1/2010 | Zalewski | ........................... 345/8 |
| 2011/0001808 A1* | 1/2011 | Mentz | ................ H04N 13/0438 348/59 |
| 2011/0032330 A1* | 2/2011 | Kim | ................... H04N 13/0029 348/43 |
| 2011/0078634 A1* | 3/2011 | Klappert et al. | .............. 715/850 |
| 2011/0141362 A1* | 6/2011 | Soundararajan | .............. 348/564 |

(Continued)

FOREIGN PATENT DOCUMENTS

| | | |
|---|---|---|
| EP | 2169967 | 3/2010 |
| WO | WO 2008/021857 | 2/2008 |

OTHER PUBLICATIONS

European Patent Office "Examination Report" dated Jan. 29, 2013 for European Patent Appln. No. 10177592.2.

(Continued)

*Primary Examiner* — Nicholas Corbo
*Assistant Examiner* — Alexander Q Huerta
(74) *Attorney, Agent, or Firm* — Ingrassia Fisher & Lorenz, P.C.

(57) ABSTRACT

Disclosure is directed to providing an electronic program guide to one or more viewers in manner that does not interfere with others' viewing of other program service content. In one embodiment, altered 3D output signals are used such that one frequency of the output signal contains an EPG data image and a second frequency of the 3D output signal contains visual content from the broadcast service transmission. In another embodiment, an EPG is periodically inserted into video stream during predetermined frames, which are then captured and held by a synchronized headset. In another embodiment, an EPG image is output through the projector onto a projection surface.

7 Claims, 7 Drawing Sheets

(56) References Cited

U.S. PATENT DOCUMENTS

| | | | |
|---|---|---|---|
| 2011/0159929 A1* | 6/2011 | Karaoguz | H04N 13/0404 455/566 |
| 2011/0161843 A1* | 6/2011 | Bennett | G06F 3/14 715/760 |
| 2011/0225611 A1* | 9/2011 | Shintani | H04N 13/0438 725/39 |
| 2011/0267437 A1* | 11/2011 | Abeloe | 348/51 |
| 2012/0081363 A1* | 4/2012 | Kang | H04N 13/0429 345/419 |
| 2012/0113115 A1* | 5/2012 | Cuttner | 345/419 |
| 2012/0190439 A1* | 7/2012 | Nourbakhsh | 463/31 |
| 2013/0063577 A1* | 3/2013 | Jun | G02B 27/2264 348/53 |

OTHER PUBLICATIONS

European Search Report dated Dec. 6, 2010, EP 10177592.2, 6 pages.

* cited by examiner

SEPARATE DISPLAY SURFACES FOR EPG AND PROGRAM CONTENT

CROSS REFERENCE TO RELATED APPLICATIONS

This application claims priority to European Patent Application No. 10177592.2 filed Sep. 20, 2010, entitled "Method of Displaying an Electronic Program Guide," which is hereby incorporated by reference herein in its entirety.

TECHNICAL FIELD

Embodiments discussed herein are directed to providing an electronic program guide to one or more viewers in manner that does not interfere with the viewing experience of others.

BACKGROUND

Cable television, satellite television, and other providers of program services typically include functionality for display of programming guide information in their services. Programming guide information may be viewed through an "electronic programming guide" (EPG) menu that is enabled by a user through input to a receiver sent through an input device such as a remote control. The electronic programming guide data typically includes program schedules, having such information as program channels and times in which various programs may be viewed on a particular channel. An EPG guide may be output in graphical form by way of a grid having channels corresponding to rows and time slots in the various columns of the grid. Once a user commands a receiver to display EPG guide information, the requested information is displayed as an overlay or otherwise over a portion of a display that is used to view a channel or other visual content from a broadcast service.

In some instances, the overlay of the EPG may interfere or partially interfere with viewing of a program service channel. This interference with the program service channel may be disruptive to one or more viewers. Specifically, the user input device may be operated by one individual who alone wishes to view the EPG. Others who are concurrently watching the television may not wish to view the EPG and may thereby have their viewing experience disrupted. Accordingly, it may be desirable to have a system in which a user is able to view an EPG in a manner that does not interfere with others' viewing and/or enjoyment of visual content output from a television or other output device.

SUMMARY

Embodiments discussed herein are directed to providing an electronic program guide to one or more viewers in manner that does not interfere with others' viewing of other program service content. In one embodiment, altered 3D output signals are used such that one frequency of the output signal contains an EPG data image and a second frequency of the 3D output signal contains visual content from the broadcast service transmission. In another embodiment, an EPG is periodically inserted into video stream during predetermined frames, which are then captured and held by a synchronized headset. In another embodiment, an EPG image is output through the projector 160 onto a projection surface.

One embodiment is directed to a method of displaying an electronic programming guide, comprising: outputting a first signal from a receiver to a display device, the first signal including program service content for display on the display device; receiving a second signal at the receiver, the second signal including a command to display an electronic programming guide; and in response to receiving the second signal at the receiver, outputting a third signal and a fourth signal from the receiver, the third signal including program service content and the fourth signal including electronic programming guide data; wherein the third and the fourth signal cause the electronic programming guide to be visible on a first display surface and cause the program service content to be visible on a second display surface.

Another embodiment is directed to a method of displaying an electronic programming guide, comprising: outputting a video signal from a receiver to a display device, the video signal including program service content for display on the display device; receiving a signal at the receiver, the signal including a command to display an electronic programming guide; in response to receiving the signal, determining if there is at least one viewer of the display device that does not want to view the electronic programming guide; and in response to determining that there is at least one viewer that does not want to view the electronic programming guide, projecting the electronic programming guide from the receiver to a projection surface external to the receiver.

Yet another embodiment is directed to a method of displaying an electronic programming guide, comprising: outputting a video signal from a receiver to a display device, the video signal including program service content for display on the display device; inserting a frame that includes an electronic programming guide image into the video signal each time a predetermined number of frames of the video have been output; and outputting a synchronization signal from the receiver that indicates a display of the frame that includes the electronic programming guide image on the display device.

DETAILED DESCRIPTION

Embodiments discussed herein are directed to providing an electronic program guide to one or more viewers in manner that does not interfere with the viewing experience of others. In one embodiment, altered 3D output signals are used such that one frequency of the output signal contains an EPG data image and a second frequency of the 3D output signal contains visual content from the broadcast service transmission. In another embodiment, an EPG is periodically inserted into video stream during predetermined frames, which are then captured and held by a synchronized headset. In another embodiment, an EPG image is output through the projector onto a projection surface.

As used herein, a "receiver" may be any device capable of receiving video and/or audio content included in a broadcast or other program service transmission from a service provider. As used herein, a service provider may include any service that provides a program service transmission to a receiver such as, without limitation, a satellite television service, a direct television service or a cable television service. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

Figure 1:
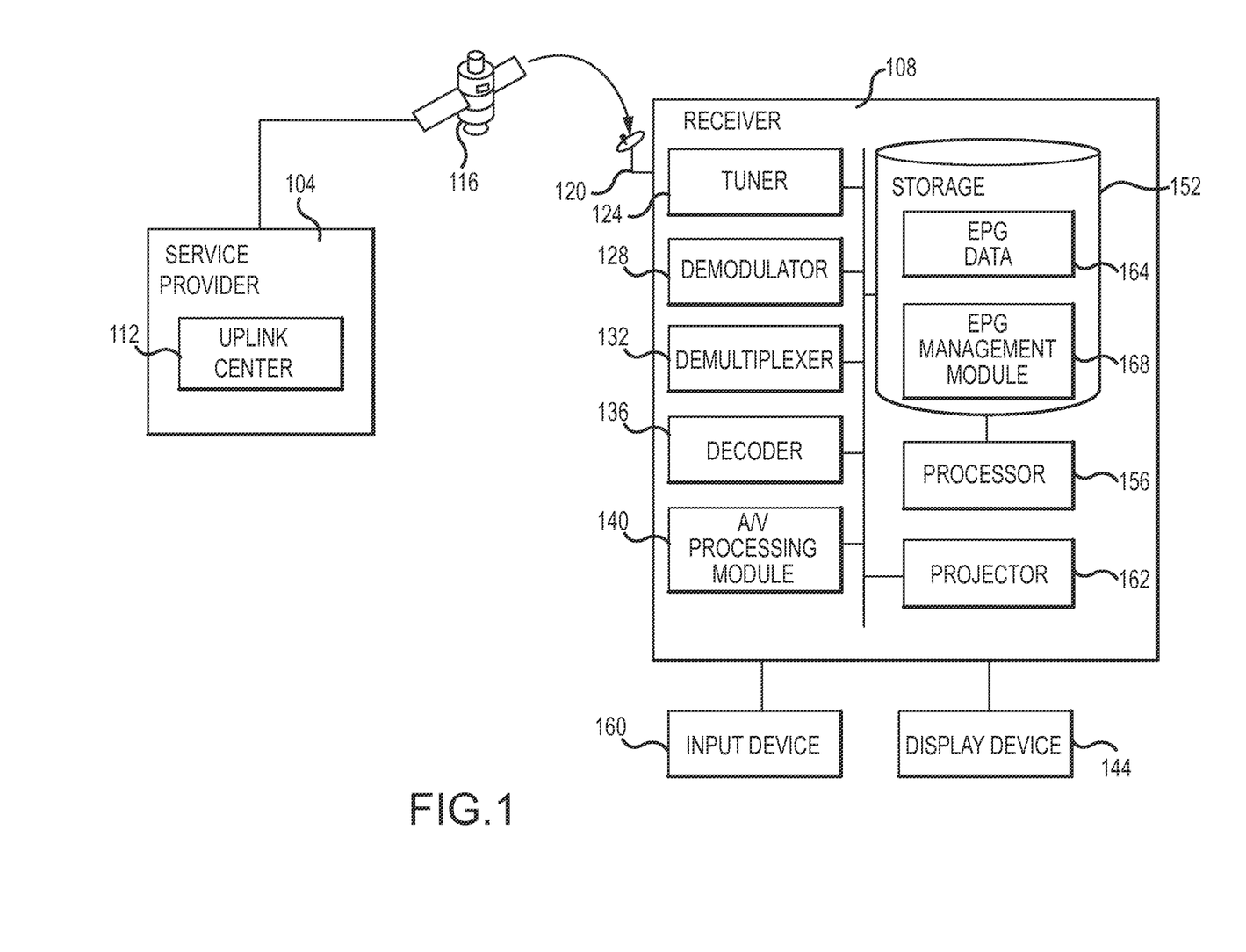
FIG. 1 is a schematic diagram showing components and feature of implementations discussed herein.

FIG. 1 is a schematic illustration of a general operating environment showing components and features of embodiments discussed herein. FIG. 1 includes a service provider 104 that transmits or otherwise provides a program service transmission to a receiver 108. The receiver 108 can include a set-top box (STB), Digital Video Recorder (DVR), a cable receiver, a general purpose computer and so on. A receiver 108 may also include a cable modem that receives streaming audio. The receiver 108 may be associated with an individual, business or other entity, user or subscriber that receives a program service transmission from the service provider 104. The program service transmission may be received through a subscription to the service. Generally the terms "user" and/or "subscriber" refer to an individual or company who receives a program service transmission. This may include those who have purchased a subscription to the program service transmission. Alternatively, the terms "user" and/or "subscriber" may refer to individuals who have been given access to the program service transmission through promotional offers and/or other non-fee-based agreements.

In connection with embodiments that operate in the context of a satellite television service, the service provider 104 may provide a program service transmission through an uplink center 112. Implementations discussed herein may utilize a direct broadcast satellite (DBS) system which can incorporate packetized transmission signals according to an appropriate standard, such as the MPEG-2 standard. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The modulated signal may be transmitted from the satellite 116 over an appropriate frequency band such as, for example, the C-band, the Ku-band or the Ka-band.

Direct broadcast satellite DBS signals may be received as downlinked signals by a satellite antenna 120. The downlinked, L-band signals may be received by a tuner 124, which selects a specific frequency range. The L-band signals received by the tuner 124 may include a number of transponder signals received from one or more satellites 116. A particular transponder signal may include a combination or multiplex of a number of transport streams associated with one or more channels. A particular transport stream may include, for example, compressed or uncompressed audio or visual data. By applying band-pass filtering techniques, the tuner 124 may select a particular transponder signal from the group of signals received from the LNBF.

The transponder signal selected by the tuner 124 may then be demodulated by the demodulator 128. Specifically, the demodulator 128 removes the sinusoidal carrier signal and outputs the information carrying signal as a baseband signal. Output from the demodulator 128 may be directed to a demultiplexer 132. The demultiplexer 132 may be an integrated circuit that accepts the packetized, time domain multiplexed data stream of the MPEG-2 transport stream and routes the packets to various components for further processing. In so doing, the demultiplexer 132 may separate out various transport streams that are contained in a particular transponder signal. A transport stream may include a number of packets having a unique packet identification (PID). In addition to routing packets of data, the demultiplexer 132 may also unscramble encrypted data and/or provide buffering of the MPEG data.

A number of transport streams may together form a service. As used herein, a "service" refers to a particular channel which is selected by a user. A particular video channel typically includes three transport streams: a video stream, an audio stream, and a data stream. When a user selects a service, for example, the demultiplexer 132 selects the appropriate audio and/or video transport stream and routes the audio and/or visual transport stream to a decoder 136, which may process the various transport streams that are output from the demultiplexer 132. The decoder 136 may include an audio decompressor portion that is operable to decompress an audio stream, and a video decompressor portion that is operable to decompress a video stream. The audio stream and video stream may be fully compliant audio and video program elementary streams as defined by, for example, ISO 13818-2 and ISO 13818-3 of the MPEG-2 standard, respectively. Output from the decoder 136 may be directed to an audio visual (NV) processing module 140. The A/V processing module 140 may process the video and audio streams using digital-to-analog conversion techniques. or compressed digital to uncompressed digital conversion techniques, to produce one or more output signals. The resulting baseband signals may then be sent to a output device 144 through appropriate connections. By way of example and not limitation, the output device 144 may include a television, a monitor, and/or a speaker system, and so on.

Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks and/or the Internet.

The display device 144 in one embodiment may be a three-dimensional (3D) television. A 3D television 144 may be provided in association with one or more headsets which are operable to process light projected from the display device 144 in order to present a three-dimensional image to the wearer of the headset. One embodiment includes a "shutter" system in which a 3D image is constructed by two images, one for each eye, that are displayed in rapid succession on the display device 144. The image for the right eye may be sent on a first frequency, and an image for the left eye may be sent on second frequency. The images may be sent using an appropriate data transmission protocol, such as High-Definition Multimedia Interface (HDMI). The images from the two frequencies may be interleaved or otherwise combined at the receiver 108 or at the display device 144 in order to produce a combined image produced by the display device 144.

Using liquid crystal display (LCD) or other similar technology, the lenses of the headset may be operable to become either transparent or opaque in order to convey an image to a particular eye. Specifically, in order to convey an image to the right eye, the right lens becomes transparent and the left lens becomes opaque. Similarly, in order to convey an image to the left eye, the left lens becomes transparent and the right lens becomes opaque. In this way, two separate images, each having a slightly different viewing angle, are sent in rapid succession to each eye. The viewer's brain interprets the difference between the images as depth and, in so doing, unites the two images into one three-dimensional picture. In order to accurately convey the separate images to the left and right eyes, the headset may receive a synchronization or trigger signal from the receiver 108 that indicates when the headset should make the lens transparent or opaque. As used herein, a "headset" generally refers to a helmet or glasses or other eyewear that is operable to process the three-dimensional signals, as appropriate.

The receiver 108 may additionally include a projector 162 that is operable to project an image on a surface that is external to the receiver 108. In accordance with embodiments discussed herein, the projector may be used to project an EPG menu onto an external surface such as a table or a wall. In connection with projecting an EPG menu, the receiver 108 may include a face and/or eyeball tracking mechanism that is used to determine the location of user who is viewing the EPG menu and/or to determine if a particular user is currently viewing the EPG menu. The projector 162 may be operable to directed the projected EPG menu in a particular direction or angle.

The receiver 108 may include or be associated with a memory or other storage device 152, such as magnetic or optical storage. The storage device 152 may be operable to store data received from the decoded satellite signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable in nature. The stored data set may include audio and/or visual content to be transmitted and output through the output device 144. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 156 operable to run executable code in connection with various functions associated with the receiver 108. For example, the processor 156 may display graphics, images, animations or other content through the output device 144. The storage device 152 may store an application, file, or other data that is useable by the processor 156. As used herein, an application includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156.

In one instance, an EPG management module 168, which is stored in the storage device 152 may be executed by the processor 156 to control output of an electronic programming guide (EPG) in a manner that is directed to particular users and/or does not interfere with others' enjoyment of program service content. In so doing, the EPG management module 168 may process an electronic program guide data that is received at the receiver 108. The EPG data 168 may provide a schedule of program content and/or other features. As used herein, the terms "electronic programming guide" or "EPG" are intended to encompass an interface provided to a user as part of a program service transmission system that includes a schedule of programming content. The EPG may include a database or otherwise access a database containing information including, for example, names or titles of viewing or listening events (programs), corresponding channel numbers and names, brief descriptions of the programs, start and finish times, and rating and content information related to the events.

In addition to other functions, the EPG management module 168 may be operable to output the EPG data 164 in a manner that is specifically directed to a particular user. In one embodiment, the EPG management module 168 is able to alter a 3D output signal such that one frequency of the output signal contains the EPG data 164 and a second frequency of the 3D output signal contains visual content from the broadcast service transmission. Instead of directing separate images to different eyes, as is the case with 3D image output; the altered output signal directs separate images to different headsets. Accordingly, in this embodiment, the EPG management module may output separate synchronization or timing signals to the separate headsets. A first synchronization signal causes a first headset to make both of its lenses transparent when the EPG image is displayed, and both of its lenses opaque when the content from the broadcast service transmission is displayed. Similarly, a second synchronization signal causes a second headset to make both of its lenses transparent when content from the broadcast service transmission is displayed, and both of its lenses opaque when the EPG image is displayed.

In another embodiment, the EPG management module 168 is operable to output the EPG data 164 periodically at predetermined frames. In this embodiment, the EPG management module 168 may additionally output a synchronization signal to one or more headsets which provides timing information operable to allow the headset to capture the periodically displayed EPG image. In another embodiment, the EPG management module 168 is operable to output EPG data 164 through the projector 162.

The processor 156 may also perform such tasks as executing commands received from a user. User commands may be sent to the receiver 108 through a user input device 160 such as remote or other wireless device. As used herein, a "user input device" may include any device operable to receive input from a user and to convey the input to the receiver 108. In one embodiment, the user input device 160 may be a hand-held device having a number of buttons or keys that when actuated by a user cause the user input device to covey information to the receiver 108 using a suitable communication means, such as an infrared signal. The user input device 160 may include a pointing device or functionality that allows the user to control the position of a cursor that is displayed on the output device 144. For example, the user input device 160 may include a track ball or glide plane that may be manipulated to control cursor movements. The user input device 160 may include a motion sensor or accelerometer that allows a user to control displayed items or graphics, such as a cursor, through movements of his or her hand or arm that cause a displacement of the user input device 160. It should be appreciated that other input devices such as a computer mouse or touch screen may be used and other communication means, wired or wireless, may be used. Information sent to the receiver 108 may include, for example, a command to change the output channel, a command to display a EPG and/or a command to navigate through the EPG.

Figure 2:
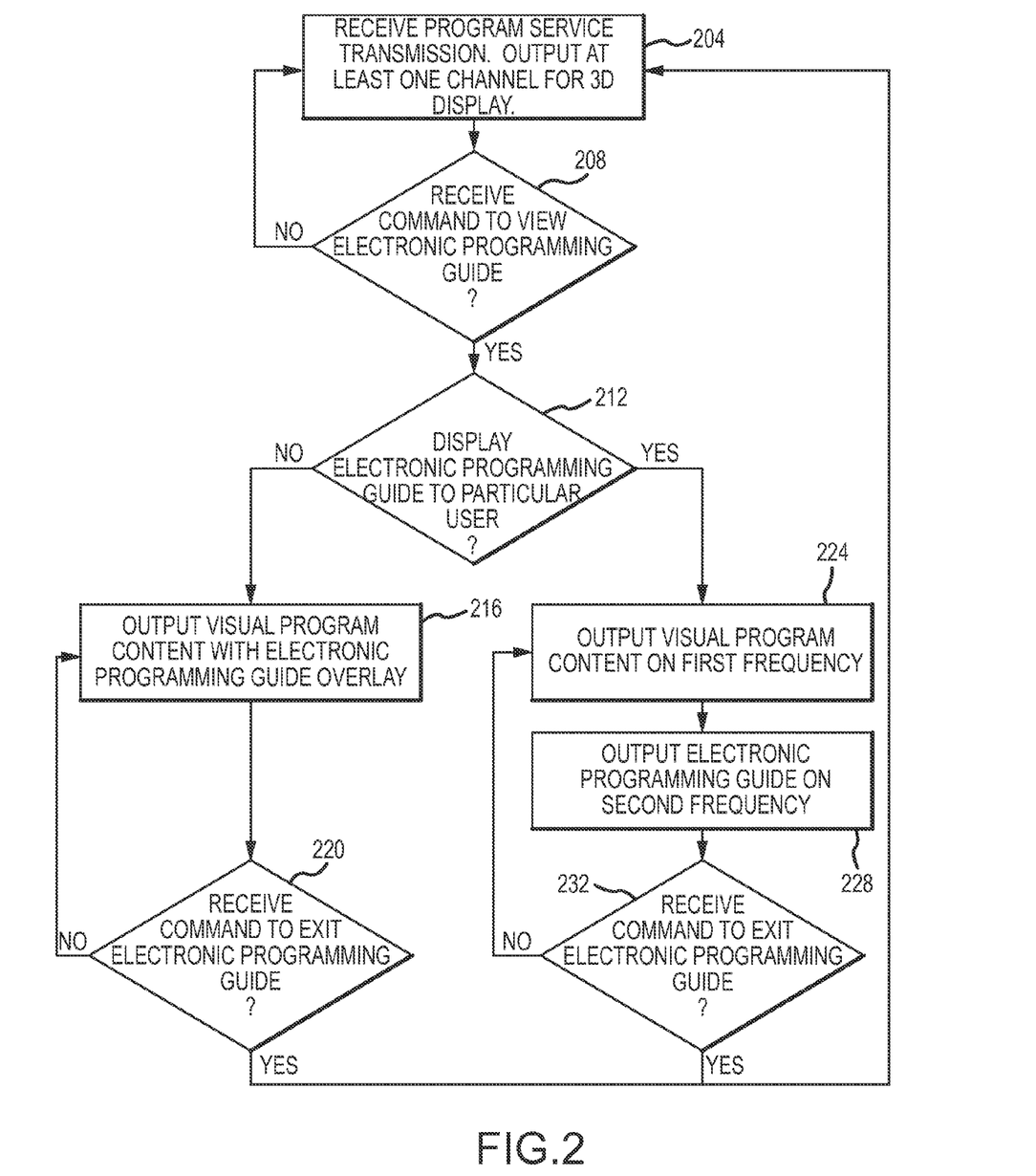
FIG. 2 is a flow chart that illustrates a method in accordance with implementations discussed herein.

FIG. 2 is a flow chart that illustrates a method of outputting an EPG image in accordance with implementations discussed herein. Initially, at operation 204, the receiver 108 receives a program service transmission from the service provider 104. As described above, this may include receiving a satellite transmission at a satellite antenna 120 and processing the received signal through the operation of a tuner 124, demodulator 128 and so on. In addition to receiving and processing the broadcast service transmission, operation 204 includes outputting at least one channel from the program service transmission for display on the display device 144. The channel output in operation 204 may be a three-dimensional video signal. Following operation 204, operation 208 may be executed.

In operation 208, the EPG management module 168 determines if a signal has been received from the input device 160 that commands the receiver 108 to display electronic programming guide data. If, in operation 208, no such command signal is received, operation 204 may follow such that program service content is continually received and displayed by the receiver 108. If, in operation 208, a command to view the electronic programming guide is received, operation 212 may be executed.

In operation 212, the EPG management module 168 determines if the EPG image is to be output to a particular user. In this regard, the user input device 160 may be operable to receive a command that indicates the manner in which the EPG image is to be output. In one mode, the EPG image may be output in the familiar manner, such that the image is overlain on top of other visual content. In another mode, the EPG image may be output to a particular user. Accordingly, if in operation 212, the EPG management module 168 determines that the EPG image is to be displayed to all users, operation 216 may be executed. In operation 216, the EPG data is output on top of or overlain on the program service channel that is currently output on the display device 144. Following operation 216, operation 220 may be executed.

In operation 220, the EPG management module 168 determines if a signal has been received from the input device 160 that commands the receiver 108 to exit from the EPG guide display. If, in operation 220, no such signal has been received by the receiver 108, operation 216 may be executed following operation 220 such that the EPG image remains displayed on the display device 144. If, in operation 220, an exit command is received, operation 204 may be executed following operation 220 such that a program service channel is output to the display device 144 without also displaying an EPG image.

If, in operation 212, the EPG management module 168 receives a command to display the EPG data 164 to a particular user, then operation 224 may follow operation 212. In operation 224, the channel or other visual content from the program service transmission is output from the receiver 108 on a first frequency. In outputting the channel or other visual content on the first frequency, the EPG management module 168 makes the visual content available to one or more users that are wearing a particular headset that is operable to receive that frequency. In so doing, the visual image seen by the user may shift from a three-dimensional image to a two-dimensional image. The signal carrying the first frequency and the signal carrying the second frequency may be combined at the receiver and sent to the display device as a combined signal. Alternatively, these signals may be sent separately from the receiver 108 to be combined together at the display device 144. Following or concurrently with operation 224, operation 228 may be executed. In operation 228, the EPG management module 168 may output a signal containing the EPG image on a second frequency. In so doing, the EPG management module 168 may make the EPG image visible or otherwise available to be seen by one or more individuals who are viewing the display device 144 with a headset operable to view the second frequency. As can be appreciated, the EPG data 164, like the program service output, is viewed to such a user as a two-dimensional image. Following operation 228, operation 232 may be executed.

In operation 232, the EPG management module 168 determines if a signal has been received by the receiver 108 that commands the receiver 108 to exit the electronic programming guide menu. If, in operation 232, no such command is received, operation 224 may be executed following operation 232 such that the visual content from the program service transmission and the EPG guide data are each output on separate frequencies. If, in operation 232, an exit command is received by the receiver 108, operation 204 may be executed following operation 232. Once operation 204 is again executed, the visual image received or seen by the first user may shift from a two-dimensional image back to a three-dimensional image. It should be appreciated that in the instance where the user, in operation 212, selects an electronic programming guide output to all users, the display of that data in operation 212 may be seen as a three-dimensional image along with other visual content that is concurrently shown.

Figure 3:
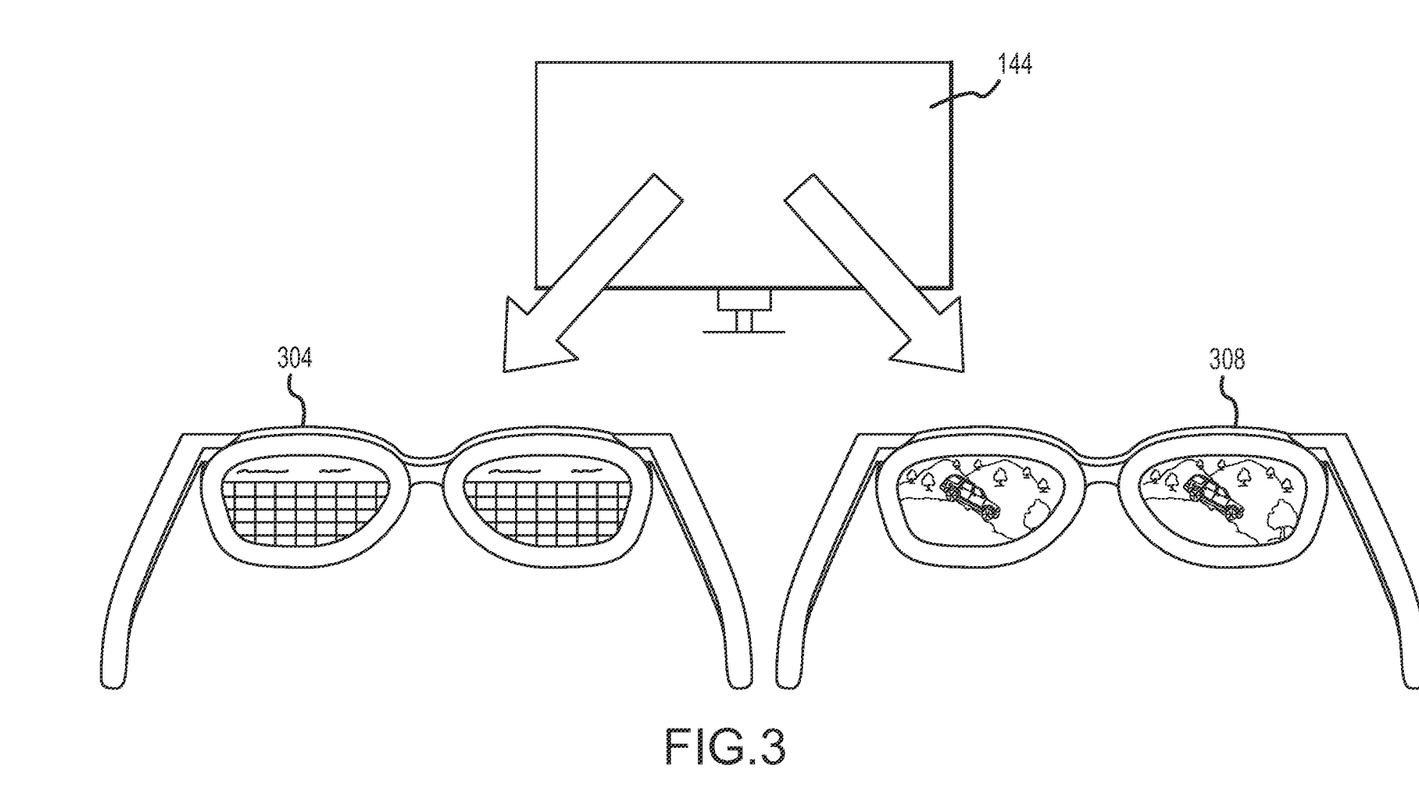
FIG. 3 is an illustration of visual output in accordance with the method illustrated in FIG. 2.

FIG. 3 is an illustration of visual output in accordance with the embodiments illustrated and described in FIG. 2. FIG. 3 includes a display device 144 that is provided in association with two headsets 304 and 308. The visual image produced by the headset 304 and the headset 308 corresponds to the output from the receiver 108 in operations 224 and 228, shown in FIG. 2. As can be seen in FIG. 3, each headset 304 and 308 is used to view the same projection surface, namely the screen of the display device 144; however, due to the filtering process associated with the headsets 304 and 308, each headset views a different image. Accordingly, the output from the display device 144 is a combination of both images seen through headsets 304 and 308. The headset 304 is operable to filter out the image that is viewed on the headset 308, namely the visual content from the broadcast service transmission. In so doing, the headset 304 is operable to pass through and thereby display the EPG data 164, which is transmitted on the first frequency. Similarly, the headset 308 is operable to filter out the content sent on the first frequency, and operable to pass through and thereby display content on the second frequency. Accordingly, through the headset 308, the visual content from the broadcast service transmission is visible as described above because only a single frequency is passed through the headset 308. The image seen therein is a two-dimensional rather than a three-dimensional image.

Figure 4:
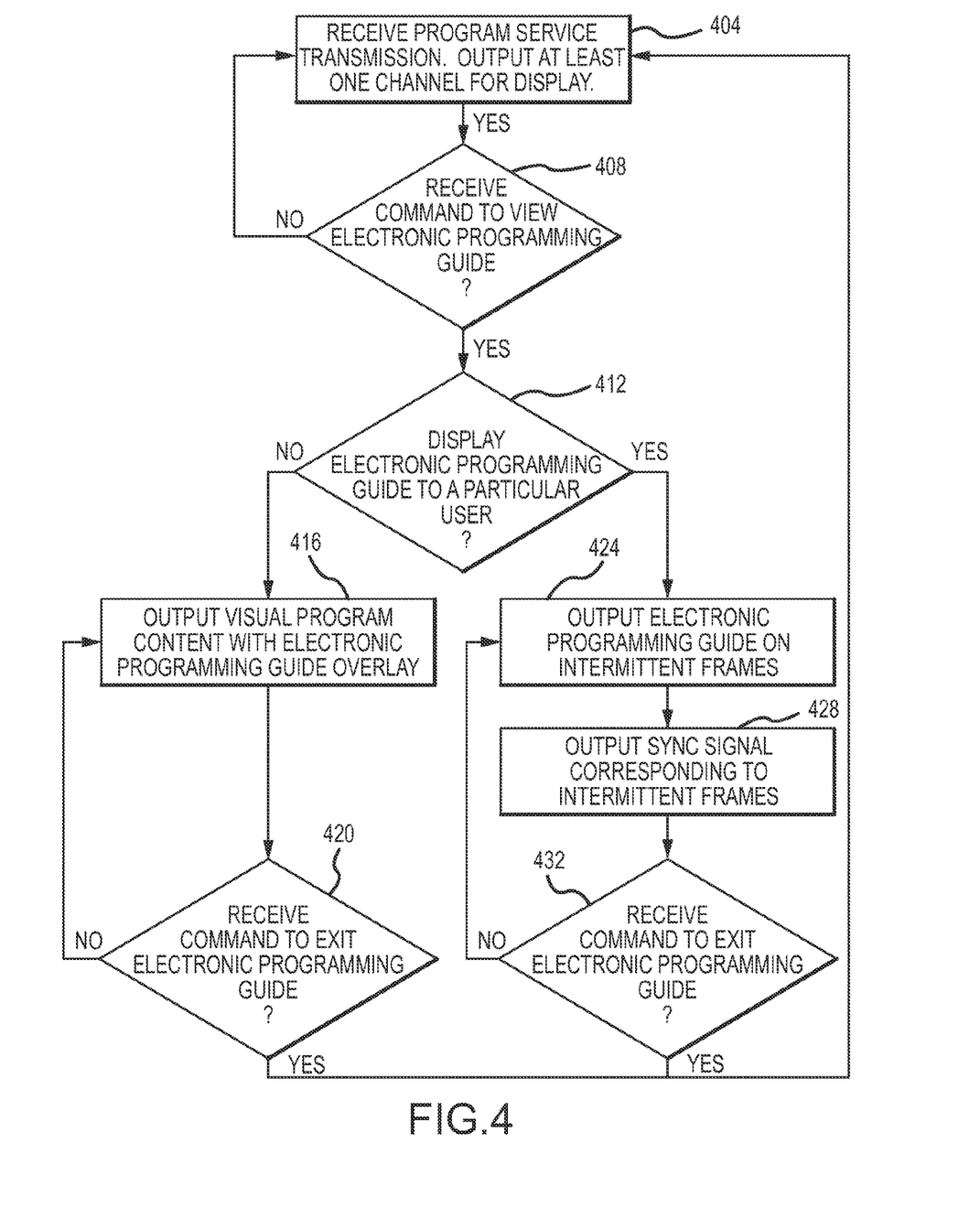
FIG. 4 is a flow chart that illustrates another method in accordance with implementations discussed herein.

FIG. 4 is a flow chart that illustrates a method of outputting an EPG image in accordance with implementations discussed herein. Initially, at operation 404, the receiver 108 receives a program service transmission from the service provider 104. As described above, this may include receiving a satellite transmission at a satellite antenna 120 and processing the received signal through the operation of a tuner 124, demodulator 128 and so on. In addition to receiving and processing the broadcast service transmission, operation 404 includes outputting at least one channel from the program service transmission for display on the display device 144. Following operation 404, operation 408 may be executed.

In operation 408, the EPG management module 168 determines if a signal has been received from the input device 160 that commands the receiver 108 to display electronic programming guide data. If, in operation 408, no such command signal is received, operation 404 may follow such that program service content is continually received and displayed by the receiver 108. If, in operation 408, a command to view the electronic programming guide is received, operation 412 may be executed.

In operation 412, the EPG management module 168 determines if the EPG image is to be output to a particular user. In this regard, the user input device 160 may be operable to receive a command that indicates the manner in which the EPG image is to be output. In one mode, the EPG image may be output in the familiar manner, such that the image is overlain on top of other visual content. In another mode, the EPG image may be output to a particular user.

Accordingly, if in operation 412, the EPG management module 168 determines that the EPG image is to be displayed to all users, operation 416 may be executed. In operation 416, the EPG data is output on top of or overlain on the program service channel that is currently output on the display device 144. Following operation 416, operation 420 may be executed.

In operation 420, the EPG management module 168 determines if a signal has been received from the input device 160 that commands the receiver 108 to exit from the EPG guide display. If, in operation 420, no such signal has been received by the receiver 108, operation 416 may be executed following operation 420 such that the EPG image remains displayed on the display device 144. If, in operation 420, an exit command is received, operation 404 may be executed following operation 420 such that a program service channel is output to the display device 144 without also displaying the EPG data 164.

If, in operation 412, the EPG management module 168 receives a command to display the EPG data 164 to a particular user, then operation 424 may follow operation 412. In operation 424, the EPG management module 168 is operable to output the EPG data 164 intermittently on selected frames. In one embodiment, the EPG management module outputs the EPG data 164 on a frame that is between every 15th and every 25th frame. In another embodiment, the EPG management module outputs the EPG data 164 on a frame that is between every 19th and every 21st frame. In still other embodiments, the EPG management module 168 outputs the EPG data on every 20th frame. Following operation 424, operation 428 may be executed.

In operation 428, the EPG management module 168 may output a synchronization signal to one or more headsets, which are used to view the display device 144. The synchronization signal sent by the EPG management module 168 is used by the headset for timing purposes in order to capture the intermittent frames of EPG images displayed on the display device 144. Specifically, once a synchronization signal is received by the headset, the headset captures and holds the frame having the EPG image. Once the EPG data frame is captured, the headset holds the captured frame until the next synchronization signal is received and the next EPG data frame is captured. Following operation 428, operation 432 may be executed.

In operation 432, the EPG management module 168 determines if a signal has been received by the receiver 108 that commands the receiver 108 to exit the electronic programming guide menu. If, in operation 432, no such command is received, operation 224 may be executed following operation 432 such that the visual content from the program service transmission and the EPG guide data are each output on separate frequencies. If, in operation 432, an exit command is received by the receiver 108, operation 404 may be executed following operation 432.

Figure 5:
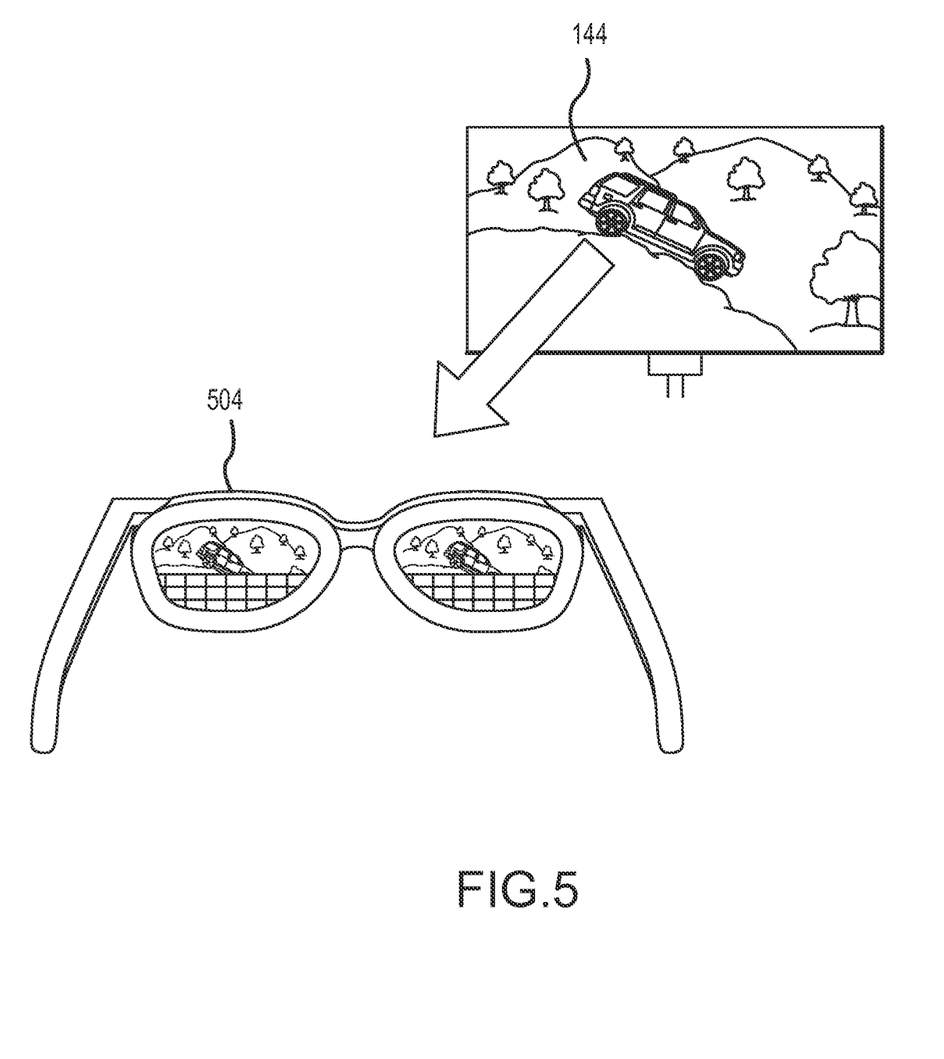
FIG. 5 is an illustration of visual output in accordance with the method illustrated in FIG. 4.

FIG. 5 is an illustration of visual content output through the method illustrated in FIG. 4. FIG. 5 includes a display device 144 and a headset 504. The visual content displayed in FIG. 5 corresponds to output from the receiver 108 during operations 424 and 428. As can be seen in FIG. 5, the display device 144 outputs visual content from the program service transmission. Concurrently with this output, EPG data 164 is output through the display device 144 on intermittent visual frames. Because the EPG data is shown only on select frames, the EPG image is not visible to the unaided eye. Specifically, the EPG data appears and disappears too quickly to be seen by the unaided eye.

FIG. 5 additionally includes a headset 504 that is operable to catch the intermittent EPG image output through the display device 144. As described in connection with FIG. 4, the headset 504 receives a synchronization signal from the EPG management module 168 which provides timing information for the headset 504 to capture the intermittent EPG image output from the display device 144. Accordingly, as can be seen in FIG. 5, the image seen through the headset 504 is a combination of the visual content from the broadcast or program service transmission and the captured EPG image. In order to capture the EPG image, the headset 504 may employ an organic light emitting diode (OLED) in one embodiment. In another embodiment, the headset may employ the use of a camera.

Figure 6:
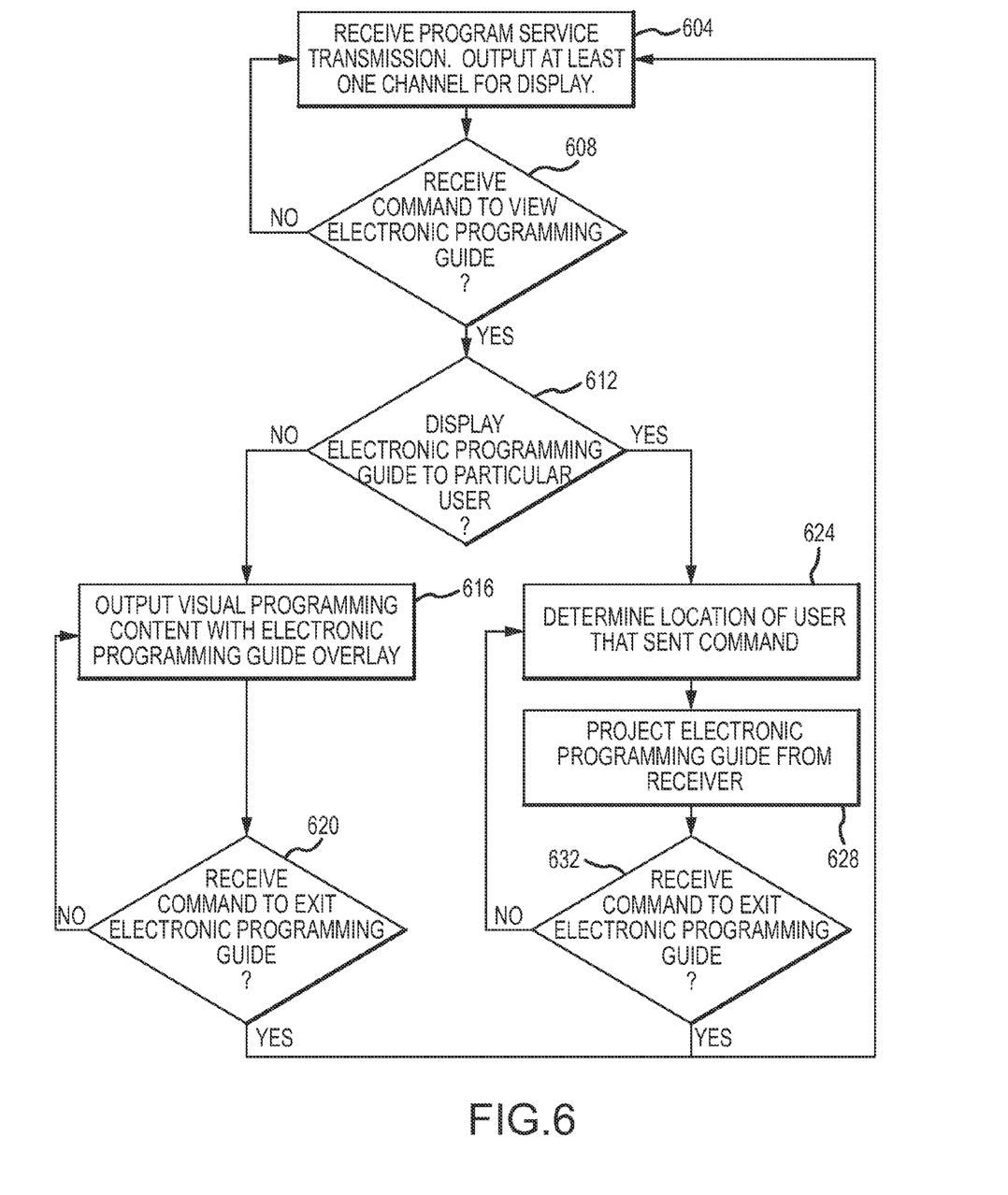
FIG. 6 is a flow chart that illustrates still another method in accordance with implementations discussed herein.

FIG. 6 is a flow chart that illustrates a method of outputting an EPG image in accordance with implementations discussed herein. Initially, at operation 604, the receiver 108 receives a program service transmission from the service provider 104. As described above, this may include receiving a satellite transmission at a satellite antenna 120 and processing the received signal through the operation of a tuner 124, demodulator 128 and so on. In addition to receiving and processing the broadcast service transmission, operation 604 includes outputting at least one channel from the program service transmission for display on the display device 144. Following operation 604, operation 608 may be executed.

In operation 608, the EPG management module 168 determines if a signal has been received from the input device 160 that commands the receiver 108 to display electronic programming guide data. If, in operation 608, no such command signal is received, operation 604 may follow such that program service content is continually received and displayed by the receiver 108. If, in operation 608, a command to view the electronic programming guide is received, operation 212 may be executed.

In operation 612, the EPG management module 168 determines if the EPG image is to be output to a particular user. In this regard, the user input device 160 may be operable to receive a command that indicates the manner in which the EPG image is to be output. In one mode, the EPG image may be output in the familiar manner, such that the image is overlain on top of other visual content. In another mode, the EPG image may be output to a particular user.

In other embodiments, a user's desire to view or to not view an EPG may be determined apart from any specific input from the user. For example, the EPG management module 168 may applying face and/or eyeball tracking to a viewer of the display device to determine a location on the display device on which the viewer is substantially focused. If the location on the display device on which the viewer is substantially focused does not corresponded to a region in which the electronic programming guide image is displayed, the EPG management module may determine that the user does not want to view the electronic programming guide. On the other hand, if the location on the display device on which the viewer is substantially focused does corresponded to a region in which the electronic programming guide image is displayed, the EPG management module may determine that the user does want to view the electronic programming guide.

If, in operation 612, the EPG management module 168 determines that the EPG image is to be displayed to all users, operation 616 may be executed. In operation 616, the EPG data is output on top of or overlain on the program service channel that is currently output on the display device 144. Following operation 616, operation 620 may be executed.

In operation 620, the EPG management module 168 determines if a signal has been received from the input device 160 that commands the receiver 108 to exit from the EPG guide display. If, in operation 620, no such signal has been received by the receiver 108, operation 616 may be executed following operation 620 such that the EPG image remains displayed on the display device 144. If, in operation 620, an exit command is received, operation 604 may be executed following operation 620 such that a program service channel is output to the display device 144 without also displaying the EPG data 164.

If, in operation 612, the EPG management module 168 receives a command to display the EPG data 164 to a particular user, then operation 624 may follow operation 612. In operation 624, the EPG management module 168 is operable to determine a location of a user, specifically the receiver 108 may employ techniques such as face recognition or eyeball scanning to determine the location and perspective in which a user will view a surface on which the EPG data will be projected. Following operation 624, operation 628 may be executed. In operation 628, the EPG management module 168 is operable to project the EPG data 164 through the projector 162.

In operation 632, the EPG management module 168 determines if a signal has been received by the receiver 108 that commands the receiver 108 to exit the electronic programming guide menu. If, in operation 632, no such command is received, operation 624 may be executed following operation 632 such that the visual content from the program service transmission and the EPG guide data are each output on separate frequencies. If, in operation 632, an exit command is received by the receiver 108, operation 604 may be executed following operation 632.

Figure 7:
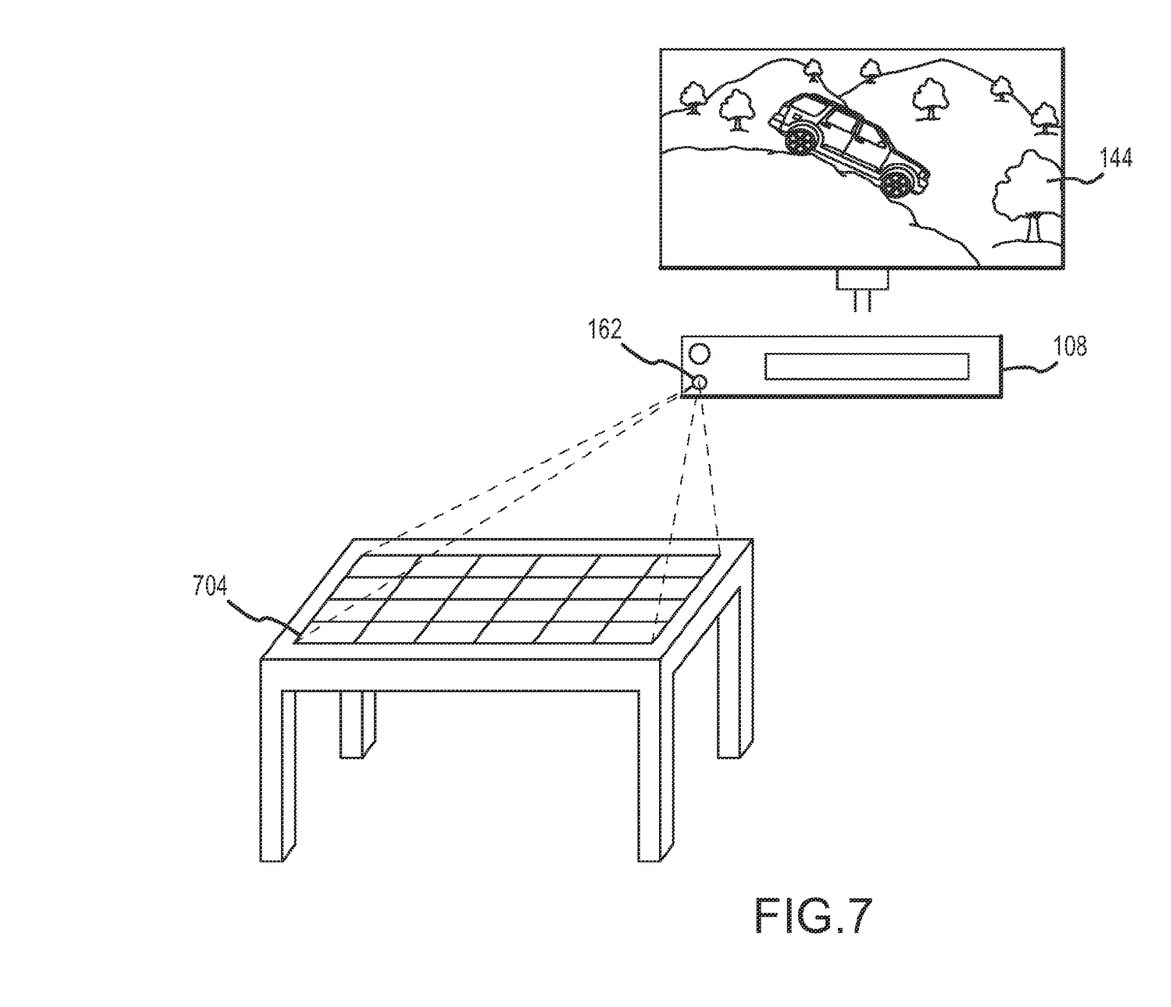
FIG. 7 is an illustration of visual output in accordance with the method illustrated in FIG. 6.

FIG. 7 is an illustration of visual output from the receiver 108 in accordance with embodiments discussed in connection with FIG. 6. FIG. 7 includes a display device 144 and a receiver 108. The display device 144 outputs visual content from the program service transmission. Concurrently with this output of a program service channel, the receiver 108 projects an EPG image on a projection surface 704. As illustrated in FIG. 7, the projection surface 704 may be a table which is nearby or in close proximity to the receiver 108. In other embodiments, the projection surface 704 may be a wall, floor, ceiling, and so on.

While embodiments are discussed herein in connection with the exemplary satellite broadcast system shown in FIG. 1, it should be appreciated that embodiments may be used in connection other types of networks or content delivery mechanisms. Generally, the disclosure includes content delivered from a provider to a receiver across or over a network. The network across which content may be delivered may include satellite system, such as the one shown in FIG. 1. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 2, FIG. 4 and FIG. 6, described herein is by way of example and limitation. Certain implementations may reorder method operations without departing from the spirit and scope of the disclosure.

The invention claimed is:

1. A method of displaying an electronic programming guide, comprising:
   outputting a first signal from a receiver to a display device, the first signal including program service content for display on the display device;
   receiving a second signal at the receiver, the second signal including a command to display an electronic programming guide; and
   in response to receiving the second signal at the receiver, outputting a third signal and a fourth signal from the receiver, the third signal including program service content and the fourth signal including electronic programming guide data;
   wherein the third and the fourth signal cause the electronic programming guide and or the program service content to be visible on a first display surface and on a second display surface, wherein the first signal is a combination of a first signal component on a first frequency and second signal component on a second frequency, the first signal component and the second signal component together cause the display device to output an image that when viewed with a headset produces a three-dimensional image for the program service content;
   the third signal is transmitted on the first frequency and the fourth signal is transmitted on the second frequency, the third and the fourth signal are sent to the display device to produce an image that is viewed with the aid of a first headset containing the first display surface and a second headset containing the second display surface;
   receiving a fifth signal at the receiver, the fifth signal commanding either or both of the first and second headsets to display the electronic programming guide in either a first or a second manner;
   the first manner filtering out content from the third signal and passing content from the fourth signal to produce the electronic programming guide; and
   the second manner filtering out content from the fourth signal and passing content from the third signal to produce a two-dimensional image for the program service content,
   wherein, when the receiver outputs of the first signal as the three-dimensional image, the receiver sends a synchronization signal to both of the first and second headsets to cause both of the first and second headset to alternate between left and right lens opacity for allowing the viewers of both headsets to view the three-dimensional image, and wherein, when the receiver causes output of the fourth signal as the electronic programming guide and the third signal as the program service content, the receiver sends a synchronization signal to the first headset to cause both lenses thereof at the same time to alternate between opacity and clarity for viewing the electronic programming guide and sends a synchronization signal to the second headset to cause both lenses thereof at the same time to alternate between opacity and clarity for viewing the program service content, and wherein the display device is a three-dimensional television with two-signal capability, and wherein providing the electronic programming guide to the second headset and the programming service content to the first headset is performed concurrently with both the headsets being reduced from a three-dimensional mode to a two-dimensional mode such that both the electronic programming guide and the programming service content are viewed in two-dimensions during the time that the electronic programming guide is separately provided to the second headset.

2. The method of claim 1, further comprising:
receiving a sixth signal at the receiver, the sixth signal including a command to exit the electronic programming guide; and
in response to the command to exit the electronic programming guide, outputting a seventh signal from the receiver to the display device, the seventh signal including program service content for display on the display device, wherein the seventh signal is a combination of a first signal component on the first frequency and a second signal component on the second frequency, the first signal component and the second signal component together cause the display device to output an image that when viewed with a headset produces a three-dimensional representation for the program service content.

3. The method of claim 1, further comprising:
combining the third and the fourth signal at the receiver to form a combined signal; and
outputting the combined signal from the receiver to the display device.

4. The method of claim 1, further comprising:
separately outputting the third and fourth signals from the receiver;
receiving the third and fourth signals at the display device; and
combining the third and the fourth signals at the display device.

5. The method of claim 1, wherein the display device includes the second display surface, and the third signal is sent to the display device to produce a program service image visible without the aid of a headset; and
the fourth signal is sent to the display device to produce an electronic programming guide image that is visible with the aid of a first headset which includes the second display surface.

6. The method of claim 5, further comprising:
sending one frame of electronic programming guide data on the fourth signal each time the third signal sends a predetermined number of video frames; and
outputting a synchronization signal from the receiver to the first headset, the synchronization signal corresponding to the occurrence of the electronic programming guide frame in the fourth signal;
wherein the headset uses the synchronization signal to capture an image produced by the display device when the display device outputs an electronic programming guide frame and to hold the captured image when display device does not output an electronic programming guide frame.

7. A method of displaying an electronic programming guide, comprising: transmitting program service data from a receiver to a display device for displaying program service content on the display device, wherein the program service data comprises a combination of a first signal component on a first frequency and second signal component on a second frequency, the first signal component and the second signal component together causing the display device to output first imagery that when viewed with a three-dimensional (3D) headset comprises the program service content in three dimensions;
receiving an input signal from a user input device at the receiver, the input signal comprising a command to display an electronic programming guide (EPG) on the display device, the input signal further comprising a display indication that indicates either option 1) that the EPG is to be displayed to all 3D headsets of a plurality of 3D headsets associated with the display device, or option 2) that the EPG is to be displayed to only a subset of the plurality of 3D headsets associated with the display device;
determining, at the receiver, whether the input signal display indication indicates option 1) or option 2); and
if the receiver determines that the input signal display indication indicates option 1), then transmitting EPG overlay data from the receiver to the display device, the EPG overlay data comprising a combination of a third signal component on the first frequency and fourth signal component on the second frequency, the third signal component and the fourth signal component together causing the display device to output second imagery that when viewed with any 3D headset of the plurality of 3D headsets associated with the display device comprises the EPG being overlaid on the program service content in three dimensions; or
if the receiver determines that the input signal display indication indicates option 2), then transmitting separated EPG data from the receiver to the display device, the separated EPG comprising a combination of a fifth signal component on the first frequency and sixth signal component on the second frequency, the fifth signal component causing the display device to output third imagery that when viewed with any 3D headset of the subset of the plurality 3D headsets comprises the EPG in two dimensions but excludes the program service content, and the sixth signal component causing the display device to output fourth imagery that when viewed with any 3D headset that is not of the subset of the plurality 3D headsets comprises the program service content in two dimensions but excludes the EPG,
wherein, when the receiver outputs of the first signal as the three-dimensional image, the receiver sends a synchronization signal to both of the first and second headsets to cause both of the first and second headset to alternate between left and right lens opacity for allowing the viewers of both headsets to view the 3D three-dimensional image, and wherein, when the receiver causes output of the fourth signal as the electronic programming guide and the third signal as the program service content, the receiver sends a synchronization signal to the first headset to cause both lenses thereof at the same time to alternate between opacity and clarity for viewing the electronic programming guide and sends a synchronization signal to the second headset to cause both lenses thereof at the same time to alternate between opacity and clarity for viewing the program service content, and
wherein the display device is a three-dimensional television with two-signal capability, and wherein providing the electronic programming guide to the second headset and the programming service content to the first headset is performed concurrently with both the headsets being reduced from a three-dimensional mode to a two-dimensional mode such that both the electronic programming guide and the programming service content are viewed in two-dimensions during the time that the electronic programming guide is separately provided to the second headset.

* * * * *